(12) United States Patent
Herceg et al.

(10) Patent No.: US 12,325,410 B2
(45) Date of Patent: Jun. 10, 2025

(54) ENERGY EFFICIENT PREDICTIVE POWER SPLIT FOR HYBRID POWERTRAINS

(71) Applicant: Garrett Transportation I Inc., Torrance, CA (US)

(72) Inventors: Martin Herceg, Bratislava (SK); Matej Pcolka, Prague (CZ); Bohumil Hnilicka, Troubelice (CZ); Daniel Youssef, Brno (CZ); Kamil Dolinsky, Prague (CZ); Jaroslav Pekar, Pacov (CZ); David Vosahlik, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 241 days.

(21) Appl. No.: 17/969,181

(22) Filed: Oct. 19, 2022

(65) Prior Publication Data

US 2024/0132047 A1 Apr. 25, 2024
US 2024/0227773 A9 Jul. 11, 2024

(51) Int. Cl.
*B60W 20/12* (2016.01)
*B60W 20/13* (2016.01)
(Continued)

(52) U.S. Cl.
CPC .......... *B60W 20/12* (2016.01); *B60W 20/13* (2016.01); *B60W 40/06* (2013.01); *B60W 40/105* (2013.01); *B60W 2554/80* (2020.02); *B60W 2710/0666* (2013.01); *B60W 2710/083* (2013.01)

(58) Field of Classification Search
CPC .... B60W 20/13; B60W 40/072; B60W 10/06; B60W 50/14; B60W 20/10; B60W 10/00; B60W 20/12; B60W 10/08; B60W 50/0097; B60L 15/2045; B60L 50/16; B60L 58/12; B60K 6/365
See application file for complete search history.

(56) References Cited

U.S. PATENT DOCUMENTS 9,014,893 B2 4/2015 Yamamoto et al.
9,114,806 B2 8/2015 Wang et al.
(Continued)

FOREIGN PATENT DOCUMENTS

CN 101548116 A * 9/2009 ............ B60K 6/365
EP 1920986 B1 5/2013
(Continued)

OTHER PUBLICATIONS

Extended European Search Report for EP 23196316.6 dated Feb. 13, 2023, 9 pages.

*Primary Examiner* — Yuri Kan
(74) *Attorney, Agent, or Firm* — Seager, Tufte & Wickhem LLP

(57) ABSTRACT

Methods and systems for operating a hybrid vehicle having a first power source that uses a rechargeable battery and a second power source that uses a fuel. Preview information relating to upcoming road and traffic is used to generate a speed reference. A transmission torque reference is calculated using the speed reference and upcoming road information. A predictive power split plan is then determined by optimizing use of the first and second power sources to satisfy the transmission torque reference. At least a first sample of the predictive power split plan is then implemented.

15 Claims, 11 Drawing Sheets

(51) Int. Cl.
*B60W 40/06* (2012.01)
*B60W 40/105* (2012.01)

(56) References Cited

U.S. PATENT DOCUMENTS

| | | | |
|---|---|---|---|
| 9,193,351 | B2 | 11/2015 | Zhao et al. |
| 9,221,455 | B2 | 12/2015 | Ito et al. |
| 9,539,996 | B2 | 1/2017 | Kristinsson et al. |
| 9,616,879 | B2 | 4/2017 | Zhao et al. |
| 10,000,201 | B2 | 6/2018 | Kim et al. |
| 10,106,143 | B2 | 10/2018 | Ogawa |
| 10,124,678 | B2 | 11/2018 | Ogawa |
| 10,712,741 | B2 | 7/2020 | Endo et al. |
| 10,894,482 | B2 * | 1/2021 | Follen .................. B60L 58/12 |
| 2005/0228553 | A1 | 10/2005 | Tryon |
| 2009/0259363 | A1 * | 10/2009 | Li ........................ B60W 50/0097 |
| | | | 180/65.265 |
| 2014/0371968 | A1 * | 12/2014 | Sakamoto .............. B60L 50/16 |
| | | | 701/22 |
| 2015/0046000 | A1 * | 2/2015 | Zhao ..................... B60W 10/08 |
| | | | 903/930 |
| 2015/0197237 | A1 * | 7/2015 | Li ......................... B60W 20/12 |
| | | | 180/65.265 |
| 2015/0268053 | A1 * | 9/2015 | Yu ........................ B60L 15/2045 |
| | | | 701/22 |
| 2016/0096527 | A1 * | 4/2016 | D'Amato .............. B60W 10/00 |
| | | | 701/102 |
| 2017/0008505 | A1 * | 1/2017 | Park ...................... B60W 20/10 |
| 2019/0389451 | A1 | 12/2019 | Huang et al. |
| 2021/0213933 | A1 | 7/2021 | Borrelli et al. |
| 2023/0150502 | A1 * | 5/2023 | Dickson ................ B60W 50/14 |
| | | | 701/95 |
| 2023/0264678 | A1 * | 8/2023 | Ogawa .................. B60W 10/06 |
| | | | 701/22 |
| 2024/0227775 | A9 * | 7/2024 | Dolinsky ............. B60W 40/072 |

FOREIGN PATENT DOCUMENTS

| | | | | |
|---|---|---|---|---|
| FR | 3120594 | A1 * | 9/2022 | ............ B60W 10/06 |
| WO | 2022013416 | A1 | 1/2022 | |

* cited by examiner

ENERGY EFFICIENT PREDICTIVE POWER SPLIT FOR HYBRID POWERTRAINS

BACKGROUND

Various algorithms have been described and designed for controlling power split and/or battery usage in a hybrid vehicle. A hybrid vehicle is any vehicle which includes an electric powertrain using a motor driven by electricity stored in rechargeable storage, and a second powertrain that consumes fuel from a refillable or replaceable onboard fuel source. The second powertrain may use, for example and without limitation, a fuel cell, gasoline, diesel, propane, natural gas, hydrogen, or any other suitable chemistry and/or technology, any of which may be an engine as used herein. Several layouts are known, including those in which the electric motor cannot be mechanically disconnected from the second power train, as well as those which use a clutch to allow disconnection of the second power train. A power split is the determination of how much power is to be obtained from each powertrain at any given time.

Some proposed analyses use preview information to aid the torque split analysis in limited ways. U.S. Pat. Nos. 9,193,351 and 10,124,678 perform a route analysis and segment the upcoming route. In U.S. Pat. No. 9,193,351, the patent teaches calculating an optimized battery state of charge (SOC) for each segment, and managing torque split to achieve the optimized SOC (as a setpoint) at the end of each segment. U.S. Pat. No. 10,124,678 characterizes each segment of the upcoming route, and optimizes power split control according to segment type. The use of segmentation indicates a plan which will not respond in real time to actual operation of the system, as the overall route is already segmented and planned. Driver, lead vehicle (or other traffic) interaction with the system will make conformity to such pre-planned route segmentation inefficient. For example, actions by the driver inconsistent with a segmented route plan can throw off the battery SOC relative to the segment SOC setpoints; in order to get back to the "plan", suboptimal operation would be needed.

Other algorithms address specific cases. For example, U.S. Pat. No. 10,894,482 offers a solution for a predicted upcoming downhill route, in which battery SOC is reduced to a lower limit in anticipation of recharge during the downhill segment. US PG Pat. Pub. 20050228553 identifies a distance and/or route to a destination based on prior usage and navigation data and turns off the non-battery power source (an internal combustion engine) in time to allow use of electric power to minimize battery SOC upon arrival.

What is needed is a more complete solution across a predicted route which allows optimization to achieve the best fuel economy over the navigation preview without locking in a rigid solution that cannot react to actual operation.

Overview

The present inventors have recognized, among other things, that a problem to be solved is the need for new and/or alternative optimization processes for hybrid power split, including the use of route preview information.

A first illustrative and non-limiting example takes the form of a method of operating a hybrid engine comprising a first power source having a battery and a second power source using a fuel, the hybrid engine being operated according to a power split to determine power generated by the first power source and the second power source, in an ego vehicle, the method comprising: obtaining preview information over a first preview window including data relating to an upcoming segment of road to be traveled by the ego vehicle; calculating an ego vehicle speed reference; calculating a transmission torque request based on the ego vehicle speed reference, using data related to the upcoming segment of road; determining a first predictive power split plan between the first power source and the second power source from the transmission torque request; and executing at least a first operation point in the first predictive power split plan; wherein the data relating to the upcoming segment of road includes one or more of curvature, slope, traffic, traffic laws, and/or traffic signals.

Additionally or alternatively, the first predictive power split plan comprises a plurality of operating points in the preview window, further comprising after executing at least the first operation point, determining a second predictive power split plan and abandoning unexecuted operating points in the first predictive power split plan. Additionally or alternatively, calculating the transmission torque request is performed by determining torque needed to meet the ego vehicle speed reference after accounting for one or more characteristics of the upcoming segment of road selected from the group consisting of road grade, road curvature, prevailing traffic speed, and road speed limit. Additionally or alternatively, calculating the ego vehicle speed reference further includes determining whether a lead vehicle is present in the upcoming segment of road, and adjusting the ego vehicle speed reference if a minimum distance to the lead vehicle is predicted to occur.

Additionally or alternatively, the second power source is an engine, and the method further includes determining an engine on or engine off state, and turning the engine on or off responsive to the determined engine on or engine off state. Additionally or alternatively, the second power source is an engine that uses a fuel; and the step of determining the first predictive power split plan comprises calculating an engine torque request by minimizing a cost function within a prediction window, the cost function comprising weighted factors for each of terminal state of charge of the battery, fuel flow, and engine torque request changes. Additionally or alternatively, the second power source is an engine that uses a fuel; and the step of determining the first predictive power split plan comprises calculating an engine torque request by minimizing a cost function within a prediction window, the cost function comprising weighted factors for each of terminal state of charge of the battery, a calculated engine torque reference, and engine torque request changes.

Additionally or alternatively, the calculated engine torque reference is calculated by identifying a highest efficiency of the engine as a function of engine speed from an engine map. Additionally or alternatively, the calculated engine torque reference is calculated using total power minimization in a control window in which an engine speed derived from the speed reference is used to find a most efficient engine torque split between the energy from the fuel and equivalent battery energy at a given engine speed. Additionally or alternatively, the step of executing at least a first operation point in the first predictive power split plan comprises receiving a driver input to determine the transmission torque request, using the predictive power split plan to determine torque from the second power source, and using the first power source to account for any difference between the transmission torque request and the torque from the second power source.

Another illustrative and non-limiting example takes the form of an ego vehicle (wherein "ego" is simply a name used to differentiate the vehicle with the controller from a lead vehicle) comprising a hybrid engine with a first power source having a battery and a second power source using a fuel, the hybrid engine being operated according to a power split to determine power generated by the first power source and the second power source, and a controller configured to determine and execute the power split by: obtaining preview information over a first preview window including data relating to an upcoming segment of road to be traveled by the ego vehicle; calculating an ego vehicle speed reference; calculating a transmission torque request based on the ego vehicle speed reference, using data related to the upcoming segment of road; determining a first predictive power split plan between the first power source and the second power source from the transmission torque request; and executing at least a first operation point in the first predictive power split plan; wherein the data relating to the upcoming segment of road includes one or more of curvature, slope, traffic, traffic laws, and/or traffic signals.

Additionally or alternatively, the controller is configured: such that wherein the first predictive power split plan comprises a plurality of operating points in the preview window; and after executing at least the first operation point, to determine a second predictive power split plan and abandon unexecuted operating points in the first predictive power split plan. Additionally or alternatively, the controller is configured to calculate the transmission torque request by determining torque needed to meet the ego vehicle speed reference after accounting for one or more characteristics of the upcoming segment of road selected from the group consisting of road grade, road curvature, prevailing traffic speed, and road speed limit. Additionally or alternatively, the controller is configured to calculate the ego vehicle speed reference by determining whether a lead vehicle is present in the upcoming segment of road, and adjusting the ego vehicle speed reference if a minimum distance to the lead vehicle is predicted to occur.

Additionally or alternatively, the second power source is an engine, and the controller is further configured to determine an engine on or engine off state, and to turn the engine on or off responsive to the determined engine on or engine off state. Additionally or alternatively, the second power source is an engine that uses a fuel; and the controller is configured to determine the first predictive power split plan by calculating an engine torque request by minimizing a cost function within a prediction window, the cost function comprising weighted factors for each of terminal state of charge of the battery, fuel flow, and engine torque request changes. Additionally or alternatively, the second power source is an engine that uses a fuel; and the controller is configured to determine the first predictive power split plan by calculating an engine torque request by minimizing a cost function within a prediction window, the cost function comprising weighted factors for each of terminal state of charge of the battery, a calculated engine torque reference, and engine torque request changes. Additionally or alternatively, the controller is configured to calculate the engine torque reference by identifying a highest efficiency of the engine as a function of engine speed from an engine map.

Additionally or alternatively, the controller is configured to calculate the engine torque reference by using total power minimization in a control window in which an engine speed derived from the speed reference is used to find a most efficient engine torque split between the energy from the fuel and equivalent battery energy at a given engine speed. Additionally or alternatively, the controller is configured to execute at least a first operation point in the first predictive power split plan by receiving a driver input to determine the transmission torque request, determining torque from the second power source by reference to the predictive power split plan, and determining torque from the first power source to account as a difference between the transmission torque request and the torque from the second power source.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
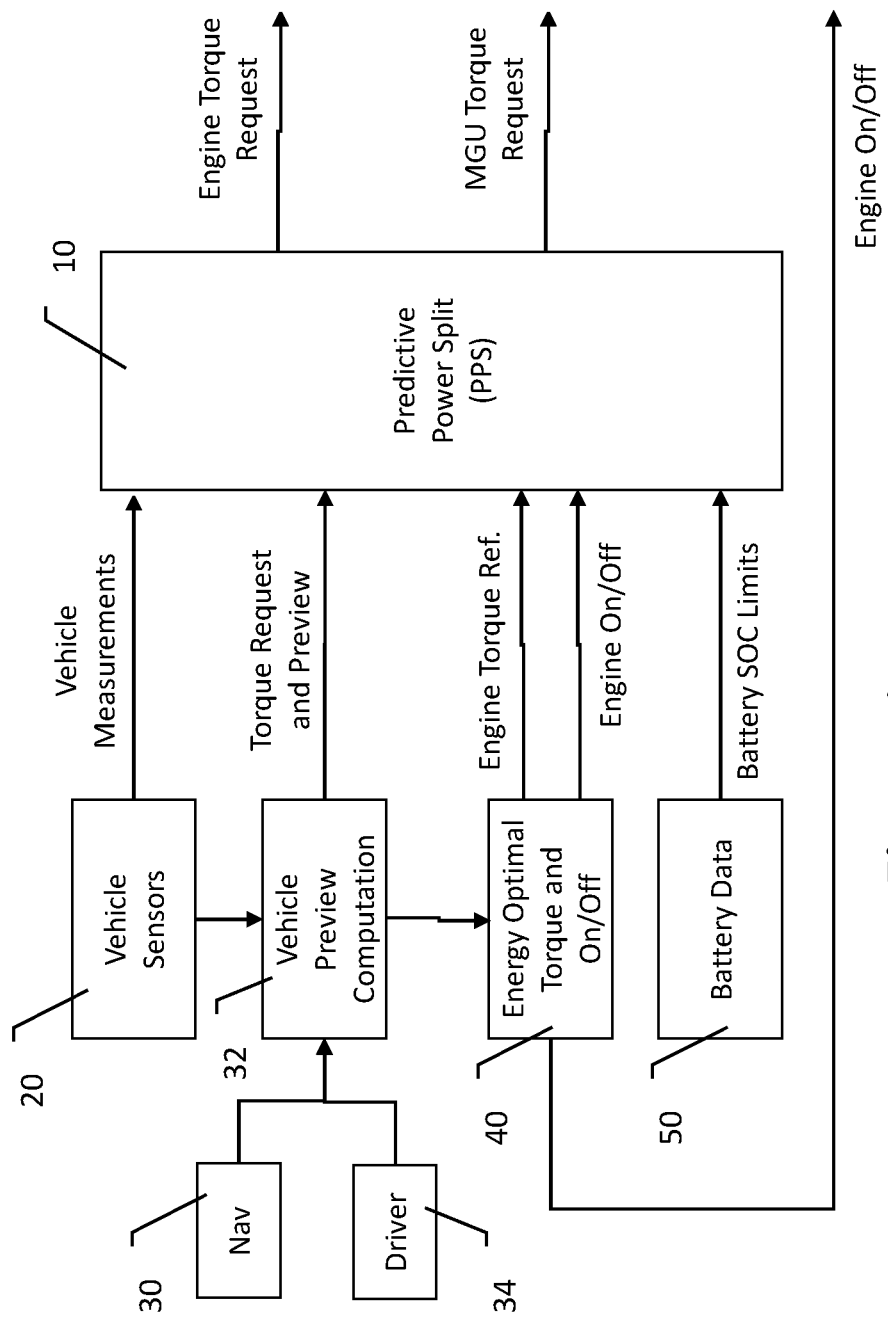
FIG. 1 is a block diagram giving a functional overview of an example.

FIG. 1 is a block diagram giving a functional overview of an example. A predictive power split (PPS) 10 serves as an optimization block for determining an engine torque request and a motor generator unit (MGU) torque request. The determination of these two torques is the "power split" of a hybrid engine. The engine may take a variety of forms, including diesel, gasoline, natural gas or other internal combustion engine, as well as any torque that may be provided by any other type of engine or powertrain used alongside an MGU, where the MGU obtains power from a rechargeable battery.

The PPS block 10 takes inputs from vehicle sensors 20, which provide vehicle measurements such as, for example and without limitation, vehicle speed/velocity, external conditions (sensed surrounding vehicles for example), state of charge (SOC) of batteries (including the MGU battery as well as the vehicle's general purpose battery). The PPS block 10 may also consider power demands exerted by other systems (air conditioning, heating, other power/electric use) in the vehicle that may affect the available power for driving the vehicle by, for example, requiring torque from the engine to drive an alternator that maintains charge on the vehicle's general purpose battery or otherwise powers non-motive systems of the vehicle.

A vehicle preview computation block is shown at 32, and obtains data from the vehicle sensors 20 relating to surroundings (including whether, for example, a lead vehicle is sensed in front of the vehicle). As used herein, an ego vehicle is the controlled vehicle, as opposed to a lead vehicle or trailing vehicle which are in front of, or behind, the ego vehicle on the route. A vehicle travelling in front of the ego vehicle may be considered a lead vehicle if it is within a predetermined distance (which may vary with travel speed)

of the ego vehicle, or if it is likely to be overtaken within the time frame of the preview window, for example and without limitation. A lead vehicle may be considered if it is within the sensor range of the ego vehicle, in some examples, such as if a radar, Lidar, or visual system is used to detect the lead vehicle, the sensing systems may have limited range (for example, a radar may be limited to 200 meters, or more or less), or due to other physical limitations, such as a visual system being unable to see around corners/curves.

The vehicle preview computation 32 also obtains preview information, that is, data from the navigation system, shown as Nav 30. Nav 30 may provide information related to the upcoming travel route, including road grade, road curvature, prevailing speed, traffic, traffic signals, weather, road quality, speed limits, etc. Nav 30 may obtain data by communicating with surrounding traffic infrastructure, cellular and/or other data networks, and/or fleet control systems, as desired. The upcoming travel route may be a planned travel route, such as when a destination has been identified, or may an anticipated travel route, whether known from historical driving patterns of a vehicle, or predicted based on current vehicle location (assuming for example that the vehicle will stay on the road it is presently on). The vehicle preview computation 32 may also obtain data from the driver 34, including, for example, wheel torque request, acceleration and/or braking request, and/or steering request. The vehicle preview computation 32 may use, for example, a requested vehicle speed set in the cruise controller by the driver.

As further described below, the vehicle preview computation 32 uses data from the Nav 30, driver 34, and/or vehicle sensors 20 to calculate a vehicle speed reference for the upcoming travel route, accounting for traffic, speed limits, comfort limits (vehicle sway), vehicle limits, and lead vehicle data. In some examples, the assumption is that a driver (whether human or not) will accelerate the vehicle until the maximum speed (limited by speed limits, traffic, or a comfort constraint) is reached. The vehicle speed reference may, for example, account for a lead vehicle by determining or estimating lead vehicle speed, finding a distance to the lead vehicle, and determining the ego vehicle speed that will not violate a minimum distance to lead vehicle constraint. For purposes of the calculation, overtaking or passing the lead vehicle is not necessarily considered, though it could be. If overtaking or passing the lead vehicle is allowed, lead vehicle calculations could be omitted to the extent the ego vehicle is not limited by the lead vehicle.

The vehicle preview computation 32 also calculates a predictive torque request along the upcoming travel route, which may include a current or next sample operating point and operating points going into the future timeline. In an example, the predictive torque request is the overall, or transmission, torque request, which is to be fulfilled by the combined engine torque request and the MGU torque request which the PPS will be issuing. In an example, the predictive torque request is determined using the vehicle speed reference (introduced above and further detailed below), route information (grade and curvature, which may be augmented if desired using windspeed or other weather data), and vehicle information (various losses such as due to friction, heat, other torque demands, such as transmission losses, tire-related losses, resistance related to aerodynamics, load, etc.) for the route within a prediction horizon. That is, the force (torque) needed to allow the vehicle to maintain the vehicle speed reference along the route is determined as the transmission torque request. Selected preview information, the torque request and, optionally, the vehicle speed reference may then be provided to the PPS 10.

An energy optimal torque and engine on/off block is also shown at 40. Two functions are provided in block 40 to determine the energy optimal references for the PPS optimization block. These are the engine torque reference, and the engine On/Off reference along the prediction horizon.

In block 40, an engine torque reference is determined using total power minimization (TPM) analysis and/or brake specific fuel consumption (BSFC) minimization analysis. The TPM calculation searches for the optimal engine torque reference throughout the prediction horizon to yield the optimized equivalent power use, considering each of fuel consumption and changes in the SOC of the MGU battery, as further discussed below. The engine torque reference for a BSFC approach may be calculated by searching for a minimum specific fuel consumption for a given torque request of the engine at a given engine speed. Illustrative TPM and BSFC examples are provided below.

The ego vehicle speed reference may be considered along with transmission gear request (when applicable) to determine the drive shaft speed. The transmission gear request is obtained from the transmission logic, which is given by the manufacturer of the vehicle. The transmission gear request will define a gear ratio (whether from a continuously variable transmission or from a transmission having selectable gears), from which the drive shaft speed can be determined using the speed reference. The drive shaft speed can be equated to the engine speed depending on the vehicle configuration. For example, a P2 configuration of a hybrid powertrain may be used. If so, a clutch separates the engine from the motor generator unit (MGU) allowing the MGU to provide drive power when the engine is off, for example. With a P2 configuration, the engine speed and MGU speed are the same when the clutch is engaged. This allows the maximum and minimum torque available from each of the engine and MGU to be readily calculated using the drive shaft speed, which can be obtained using the transmission gear request and the ego vehicle speed reference through the prediction horizon. In addition, if the drive shaft speed is known, then a maximally efficient engine torque can be calculated from the engine map provided by the manufacturer, which will map maximum torque efficiency for a given engine speed.

The Engine On/Off determination is optional but will usually be included in an implementation. With a hybrid drive vehicle, the MGU is typically able to fully power the vehicle for periods of time, and the question is whether and when the engine may be turned off to allow electric-only operation. Block 40 may perform a rules-based calculation to determine, or may use a cost calculation to determine whether and when the engine can be switched from On to Off, and from Off to On, as further detailed below.

Finally a set of battery data is provided at block 50. This may include Battery State of Charge (SOC) limits and/or battery SOC references, as indicated. SOC limits may be fixed or may vary in response to various battery characteristics, including internal temperature, age and/or battery state of health, for example. SOC limits on the battery may further include limits on how frequently, or for how long, the battery is charged, discharged, or held at selected levels of SOC and state of health. In some examples, it may be desired for the battery to remain at selected level of SOC, and block 50 may provide the battery SOC reference for the PPS optimization to stay at the SOC target, The PPS 10 then takes the provided information to split the transmission torque request into each of an engine torque request and an MGU torque request, subject to actual measurements, given preview data, references, and operating limits. The two outputs are then issued to the engine controller and the MGU controller, respectively, which will then implement control commands to generate the desired torques. In some examples, the PPS 10 is implemented as to provide a real-time solution of an optimization problem, such as using Model Predictive Control (MPC), including for example, non-linear MPC (NMPC). Some examples use a cost function to drive the MPC design, where the cost of various operational steps and characteristics, as weighted by system settings/tuning, are minimized to generate an optimized torque split through the prediction horizon.

Within the prediction and/or control window, a duration of seconds to minutes may be contemplated. However, in some examples, a small number of samples of the calculated prediction and control solution are implemented before the process is iterated and performed again. For example, the process may repeat with each data sample (for example, 100 Hz to 1 Hz, or more or less), so that only a single sample of the predictive power split is used. That is, the preview computation at 32 may cover a relatively longer portion of the driving segment, and the energy optimal torques from block 40 may be calculated using that longer view, but are updated so as to use less than half, or less than one-quarter, or less than ten percent of the preview window for control. Doing so enables more frequent updating of the control actions, allowing driver actions, changes in traffic or other conditions, and divergence between actual operation and modeled behavior to be continuously addressed with updates. Relative to certain references discussed in the background, this use of a long prediction and relatively shorter implementation before iteration and regeneration of control targets provides greater responsiveness. This approach differentiates the present solution from solutions in U.S. Pat. Nos. 9,193,351, 10,135,678, and/or 10,894,482 which perform segmentation and characterization of the upcoming route as a way to set parameters of each route segment. Planned segmentation of the route may limit responsiveness to driver controls and external conditions that can change quickly, as well as to incompleteness of the incoming information.

An illustrative example may be characterized by stating that the vehicle preview computation 32 determines from the driver, Nav 30 and/or vehicle sensors a vehicle speed reference, which also accounts for vehicle capabilities such as acceleration, traction, etc., providing an estimated speed profile along all or at least a portion of the route that is within the prediction horizon. The vehicle speed reference is provided to an energy optimal torque and on/off logic block 40, which generates engine torque references and engine on/off determinations by analysis of the estimated speed profile and vehicle/route preview information passed on by block 32 from the driver, Nav 30, and vehicle sensors 20. The PPS 10 then uses the engine torque references and engine on/off predictions from block 40, along with current torque request and preview information from block 32, to set the current power split and generate engine torque request and MGU torque request. The process may iterate from time to time, providing new torque references for the PPS 10 to apply. The PPS 10 uses the torque references from block 40 to evaluate the cost of various control actions when generating the torque requests. The PPS 10 may include in its cost function a term that associates a weighted cost with changing process parameters, such as changing engine torque request and/or battery SOC. Overall the system is using a relatively longer view (the prediction horizon) to estimate "efficient" mean or average engine torque utilization, and then making control decisions on a sample by sample basis using received transmission (overall) torque requests from block 32, with repeated updating of the average engine torque utilization estimate. The driver's torque request (whether that driver is a person or an autonomous control) are considered for the current time step, while the rest of the prediction horizon torque requests are predicted by block 32.

In FIG. 1, and in other drawings herein, the various control blocks (such as PPS 10, vehicle preview computation 32, energy optimal torque and On/Off block 40, etc., may be embodied as one or more microcontrollers, microprocessors, computers, electronic control unit (ECU) or other physical manifestation of control/logic and other circuitry operating on embedded or stored instruction code to perform various analytical and logic functions, including the math described herein. In some example, a computer or microprocessor and associated memory may be included as an ECU in a vehicle and may include machine readable instructions on non-transitory media for performing processes as disclosed herein. More detailed discussion of particular examples follows.

Figure 2:
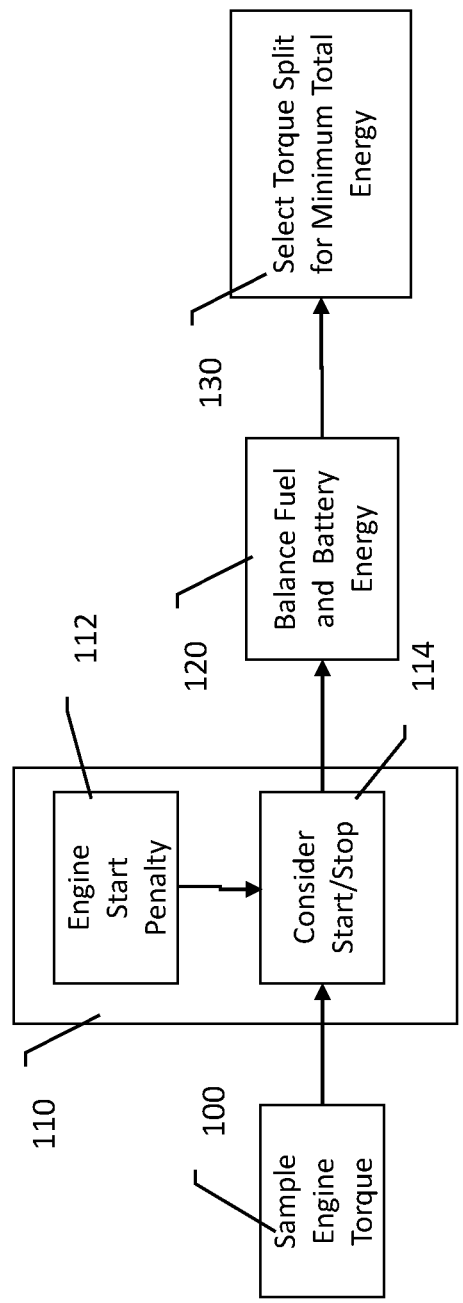
FIGS. 2, 3 and 4A are block diagrams of methods of engine torque reference calculation.

FIG. 2 is a block diagram of an engine torque reference calculation. FIG. 2 illustrates a total power minimization (TPM) approach. The TPM approach determines an engine torque reference, MGU torque reference, and engine on/off request along the prediction horizon. At each time step, the TPM processes preview signals, including the predicted transmission torque request, transmission speed, and auxiliary power demand for each sample point in the prediction horizon, and may further consider other signals such as battery temperature.

Using at least the actual (current) and predicted (future) transmission speed, limits for engine and MGU torques are calculated along the prediction horizon. Using engine and MGU torque limits, given by physical limits of transmission, battery, MGU, etc., the TPM then determines upper and lower bounds on engine torque to determine the engine torque search space. The lower bound on engine torque is defined by the minimum engine torque that is needed to deliver the transmission torque request, if the prediction horizon contains samples in which the MGU alone cannot deliver the transmission torque request. The lower bound must respect the minimum engine torque given by the physical limits of the transmission and battery. The upper bound on engine torque is limited by the maximum torque MGU can use for battery recuperation (in situations when MGU recuperation limits are reached additional torque from engine would lead to MGU violating the limits on MGU recuperation torque). The upper bound on engine torque must respect the maximum engine torque limits given by the physical limits of the transmission and battery.

When the upper and lower bounds for engine torque along the prediction horizon are established, TPM generates a set of feasible engine torques for current transmission torque request and for each sample of transmission torque request along the prediction horizon. These engine torques are feasible candidates that can be used to deliver the current and predicted transmission torque request.

This sequence provides the sampled engine torque 100. Skipping engine start/stop 110 for now, for analysis purposes, the MGU torque corresponding to each feasible engine torque candidate at each sample can then be calculated by simple subtraction of engine torque candidate from the corresponding transmission torque request. For each engine torque candidate and associated MGU torque candidate, the TPM analysis then calculates associated fuel consumption and battery power. The battery power demand is assessed using an equivalent battery energy block 120. It should be noted here that the equivalent battery energy 120 will include a correction factor to account for losses due to energy storage and conversion as the battery is charged and discharged, and losses associated with generating torque from stored electricity at the MGU.

Fuel consumption by the engine is assessed using a fuel consumption map, typically obtained from the engine manufacturer. Fuel consumption for the engine, $F_{ENG}$, and battery power consumed at each time step, $P_{BAT}$, are used to calculate the equivalent fuel consumption H, using for example this formula:

$$H = F_{ENG} A_l + \lambda P_{BAT}$$

Where $A_l$ is the low heating value of fuel, and A is the conversion factor from power to fuel. The battery power demand/consumption $P_{BAT}$ is related to the MGU power, $P_{MGU}$, by the various efficiency and conversion factors noted above (for example, when the battery is charged and then discharged, there are associated resistive, heat and/or other losses, and the MGU is not 100% efficient), as well as any additional power requests in the vehicle which can be lumped together as the auxiliary power request. For an example, $P_{BAT}$ may be understood as equaling the corrected MGU power request, $P_{MGU}$, plus the auxiliary power request, $P_{AUX}$.

Optimal engine torque is then selected from the various sampled engine torque candidates by selecting the candidate minimizing the equivalent fuel consumption H found in the evaluation at block 130.

If engine/start stop functionality is enabled, block 110 is included. Here, the fuel consumption for those sample points where the engine would be off is set to zero, however, an engine start penalty is added to the calculation as shown at 110, 112, 114 to account for engine starting after stopping. Additionally or alternatively, a fuel penalty may be added for stopping the engine. The engine start/stop is integrated into the searching algorithm so that at any given point where the engine torque would be at a minimum, the engine-off possibility is considered. Because of the inclusion of an engine start and/or stop penalty, the search algorithm does not need to define a minimum time on or off, though such a functionality may be implemented as well, if desired. The engine start or stop penalty may be set to exceed the fuel savings that could result from a short off time, if desired.

Figure 3:
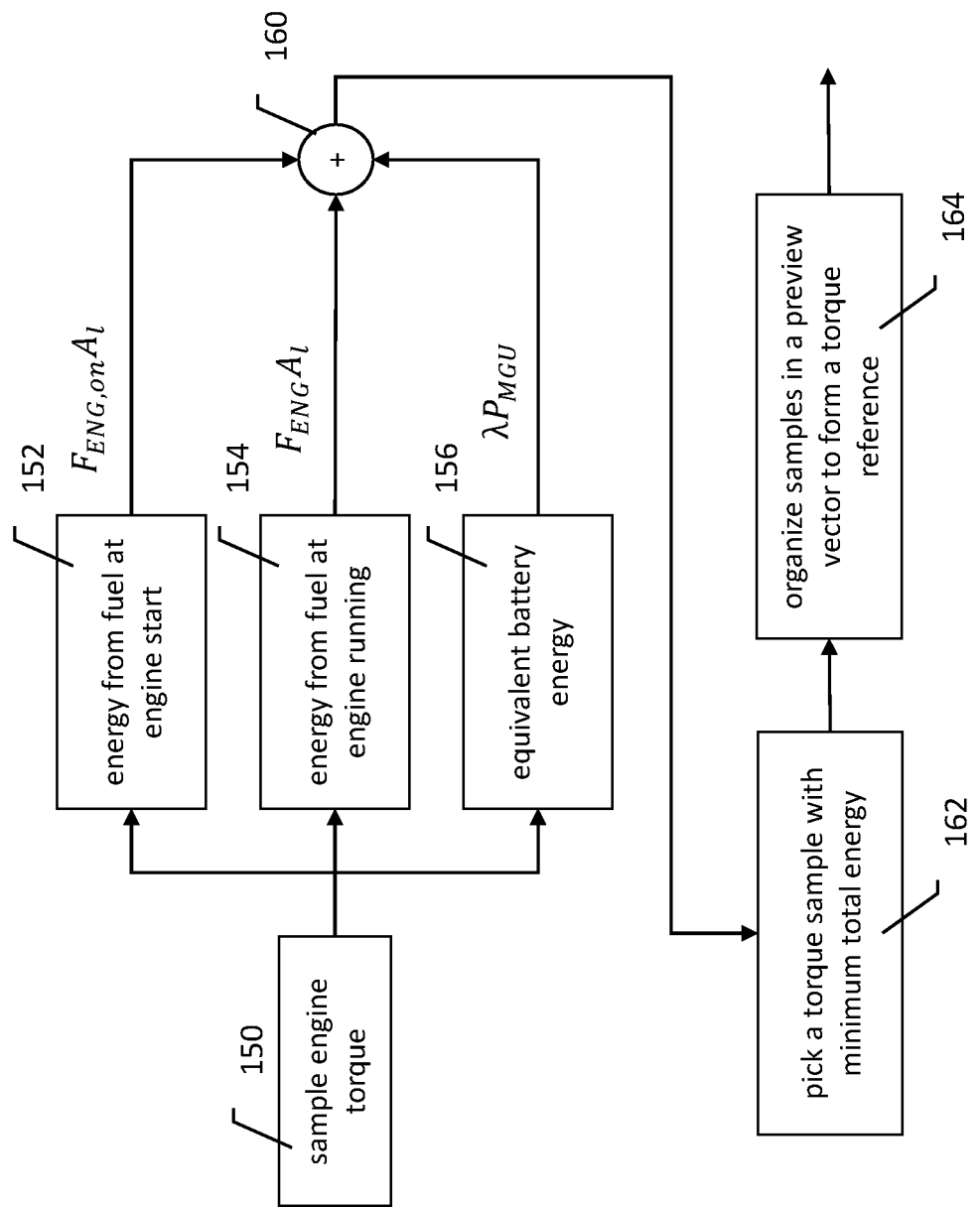

FIG. 3 shows the TPM approach in a block flow diagram. As noted previously, engine torque is sampled, using upper and lower bounds as described above, as shown at 150. Energy from fuel at the engine start 152, energy from fuel when the engine is running 154, and equivalent battery energy 156 are summed at 160, creating the cost function as shown here:

$$(F_{ENG} + F_{ENG,on}) A_l + \lambda P_{MGU}$$

Where $F_{ENG}$ is the fuel consumption for the combustion engine, $F_{ENG,on}$ is the fuel consumption for engine start event, $A_l$ is the low heating value of fuel, $\lambda$ is the conversion factor from power to fuel and $P_{MGU}$ is the MGU power. This cost function at 160 can be minimized. The engine off signal corresponds to the case where engine minimum torque is applied if feasible to start the engine. The minimization occurs at 162, where a torque sample for each point with minimum total energy usage is selected. The torque samples are organized in a preview vector to form the torque reference, as indicated at 164.

The smoothness of the calculated engine torque can be controlled if the cost function is expanded with a term penalizing the change between the current and the previous engine torque. In an example, the torque change penalty may be omitted if the engine was off in the preceding sample.

In some examples the conversion factor A may be adapted according to measured (or predicted) value of SOC in order to provide an engine and MGU torque reference that will not cause SOC to violate the SOC limits.

In some examples, if TPM is used as shown in FIG. 2, the engine torque reference is regenerated at each sample point.

Figure 4A:
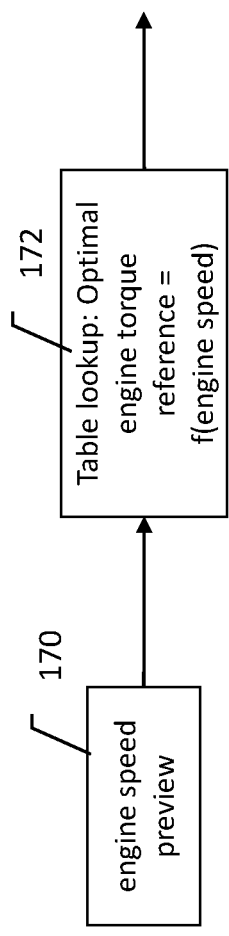

Returning to block 40 of FIG. 1, a brake specific fuel consumption (BSFC) approach can be used to determine the transmission torque reference. In the BSFC, the engine torque map is used, as such mappings indicate the engine torque having minimum fuel consumption for a given engine speed. An engine torque map can be determined using known methods in the art and would be obtained from the engine manufacturer. The BSFC reference does not account for the presence of the MGU. Instead, the BSFC approach will select the optimal engine torque from the engine speed, and uses the MGU to accommodate differences between the torque coming from the engine and the transmission input torque request. Thus, as shown in FIG. 4A, the engine speed preview 170 is obtained using the speed reference and the transmission gear request, as discussed previously. Then the optimal engine torque reference can be obtained at 172 using the engine torque map.

Figure 4B:
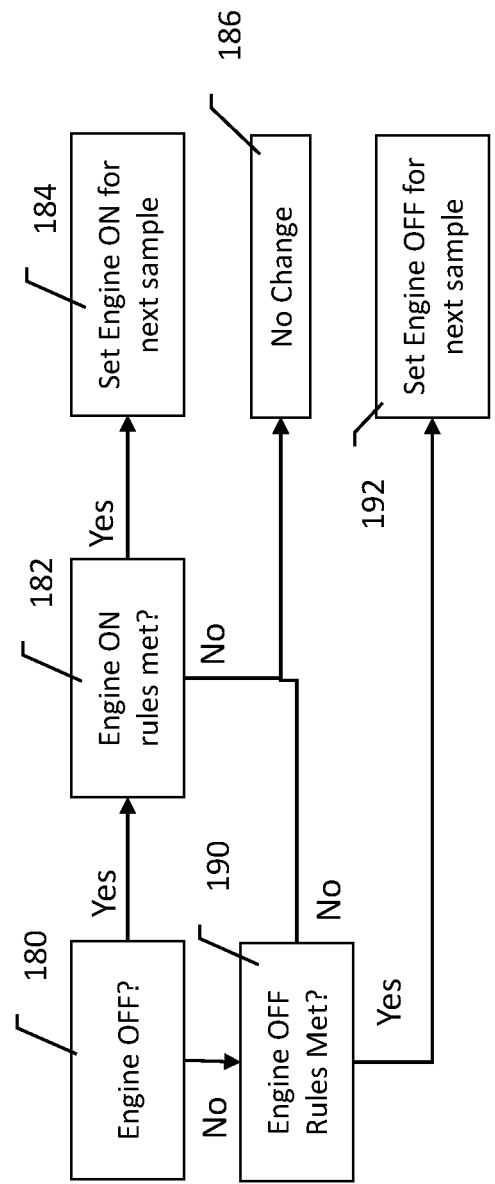
FIG. 4B is a block diagram for an engine ON/OFF calculation.

The BSFC approach uses the preview information and then applies, through the prediction window, a set of rules to determine whether the engine should be ON or OFF at each point. As shown in FIG. 4B, the analysis starts by determining if the engine is OFF, at 180. If so, the method determines whether Engine ON conditions (from the OFF state) are met at 182, using in an example, the following factors:

a. Transmission torque request greater than a threshold
   b. Battery SOC is below a threshold (the threshold may be a target SOC, less a margin)
   c. Vehicle is not (heavily) braking and the vehicle is not at a standstill
   d. OFF time exceeds a threshold For the engine to turn ON from the OFF state, either A or B must be met, and C and D must both be true. If block 182 yields a "Yes", then the Engine state is set to ON for the next sample as indicated at 184. Otherwise, no change takes place as indicated at 186.

If the Engine is ON at block 180, the method proceeds to block 190, and determines whether the Engine OFF rules are met. Engine OFF conditions (from the ON state) include, in one example, the following:

w. Battery SOC exceeds maximum SOC limit
   x. Heavy braking or the vehicle is stopped
   y. Transmission torque request less than a threshold with battery SOC above the battery SOC target plus a margin
   z. A minimum ON time flag has been set "Heavy" braking may be determined by comparison of applied (negative) torque force to a threshold for example, such as the MGU torque limits. In an example, in order to turn OFF the engine from the ON state, any one of w, x, and y (no need for engine torque when any of w, x or y are met) must be true, and z must be true (a minimum ON time has been reached). If Engine OFF rules are met at 190, then the engine is set to OFF for the next sample, as indicated at 192, otherwise, no change takes place as indicated at 186.

The above sets of factors/rules for engine ON and OFF conditions may vary in other examples. For example, if the MGU is used to provide cranking power for starting the engine, a low MGU battery rule may be applied separately to start the engine before the MGU battery reaches a low charge state that would potentially be unable to crank the engine sufficiently for starting; other extremum conditions may be addressed as well for engine ON/OFF states, as well as other input factors, for example, if traffic signal data is known, then when the vehicle is stopped at a traffic light that is about to terminate the No-Go period (the light is about to turn green, in many geographies), an additional factor may allow engine ON to be declared in anticipation of the light changing. These additional factors are optional.

A calibratable switch may be provided to allow selection between BSFC and TPM approaches. For example, the TPM approach may be favored for use in urban or slow traffic situations, while the BSFC approach may be favored for highway situations. In an example, a system may be operable to select between TPM and BSFC approaches by comparing an average or median speed of the calculated speed profile to a threshold, and selecting TPM if the average or median speed is below the threshold, and BSFC if the average or median speed is above the threshold. Alternatively, a given system may be configured with only one of BSFC and/or TPM available.

Returning to the PPS 10 in FIG. 1, a nonlinear model predictive control (NMPC) module provides real-time optimization to the control strategy. The NMPC module computes the optimal engine torque request which solves the following non-linear optimal problem:

$$\min_{u_0, u_1, u_2 \ldots, u_{Nc}} J_i$$

The cost function is minimized by an iterative calculation, subject to these conditions:

$$x_{k+1} = f(x_k, u_k)$$

$$y_k = g(x_k, u_k)$$

$$u_{MIN} \leq u_k \leq u_{MAX}$$

$$y_{MIN} \leq y_k \leq y_{MAX}$$

The above nonlinear control problem formulation considers cost function $J_i$ subject to control-oriented model that comprises of vector-valued functions $f(x,u)$ and $g(x,u)$ that are functions of states x and inputs u parameterized with the discrete sample time k. The functions $f(x,u)$ and $g(x,u)$ represent a discrete time control-oriented model of the powertrain according to the given architecture. The powertrain model can be built by integrated models for the engine, MGU, and battery to a state-space form suitable for real-time optimization.

The decision variable u corresponds to engine torque request that is limited by minimum $u_{MIN}$ and maximum $u_{MAX}$. The model predictions for battery state of charge are limited between minimum $y_{MIN}$ and maximum limit $y_{MAX}$.

The variables description of the nonlinear control problem may include the following:
- $s_1$ is a label describing the battery SOC target
- $s_2$ is a label describing the target for fuel, typically set to zero
- r is a label describing the engine torque reference
- $Q_{r,end}$ is a label describing a terminal weight for battery SOC
- $Q_r$ is a label describing a weight for target fuel tracking
- $R_r$ is a label describing a weight for engine torque reference
- $R_\Delta$ is a label describing a weight for changes in the engine torque request
- $x_1 = y_1$ is the internal state corresponding to the battery SOC
- $y_2$ is a label describing fuel consumption
- N is a label describing the prediction horizon
- $N_c$ is a label describing the control horizon Regarding the battery SOC, some examples apply a rule for the SOC at the end of the control horizon, or alternatively at the end of the prediction horizon, of 50% SOC; other values can be used if desired. It should be kept in mind that, most of the time, the control horizon will not include the destination; if a destination is known a separate rule may be applied to modify the target end-of-horizon SOC.

In some examples, the battery SOC max and min constraints may be soft limits that can be temporarily violated although, in response to violations, the controller generates control actions to suppress such violations. Upper and lower limits may instead be treated as positive slack variables, if desired. A tunable diagonal matrix can be added to the cost function to manipulate possible amounts of overshoot of the any constraints. Taking such steps, the non-linear optimal problem may be adjusted to:

$$\min_{u_0, u_1, u_2 \ldots, u_{Nc}} J_i + Gz_{MIN}^2 + Gz_{MAX}^2$$

Using slack variables $z_{MIN}$ and $z_{MAX}$, where $Gz^2_{MIN} + Gz^2_{MAX}$ represent the output limits overshoot penalization. The augmented cost function is then subject to these conditions:

$$x_{k+1} = f(x_k, u_k)$$

$$y_k = g(x_k, u_k)$$

$$u_{MIN} \leq u_k \leq u_{MAX}$$

$$y_k \leq y_{MAX} + z_{MAX}$$

$$-y_k \leq -y_{MIN} + z_{MIN}$$

$$z_{MIN} > 0, z_{MAX} > 0$$

Two different cost functions, $J_1$ or $J_2$, can be defined, either of which may be used. First, for fuel reference tracking:

$$J_1 = (s_{1,N} - y_{1,N})^T Q_{r,end} (s_{1,N} - y_{1,N}) +$$

$$\sum_{k=0}^{N} (s_{2,N} - y_{2,k})^T Q_r (s_{2,N} - y_{2,k}) + \sum_{k=0}^{N_c} (u_k - u_{k-1})^T R_\Delta (u_k - u_{k-1})$$

The fuel reference tracking cost function can be understood as summing the penalty on terminal value of the SOC (SOC at the end of the prediction horizon), with the penalization on fuel flow and changes in engine torque request during the control horizon.

Second, for torque reference tracking:

$$J_2 = (s_{1,N} - y_{1,N})^T Q_{r,end}(s_{1,N} - y_{1,N}) +$$

$$\sum_{k=0}^{N_c}(r_k - u_k)^T R_r(r_k - u_k) + (u_k - u_{k-1})^T R_\Delta(u_k - u_{k-1})$$

The torque reference tracking cost function can be understood as summing the penalty on terminal value of the SOC, with penalizations on engine torque reference and changes in engine torque request during the control horizon.

The control system may use either the fuel reference tracking or torque reference tracking to determine a control solution. Computations may include a combination of online and offline calculations. At each time step, the NMPC solves an online optimization to provide the engine torque request, and calculates the MGU torque request to meet the overall system torque request. In addition, at each time step, the NMPC produces information for a diagnostic module to identify faults if any malfunction happens during the online optimization.

Calculation of the MGU torque is as shown here:

$$T_{MGU,REQ} = T_{TRSM,REQ} - T_{ENG,REQ}$$

The MGU torque request, $T_{MGU,REQ}$ is thus the difference between the transmission input torque request, $T_{TRSM,REQ}$ and the computed engine torque request, $T_{ENG,REQ}$ from the NMPC block. It can be seen then that the engine torque request is generated using the current system state and the torque references that are obtained using the preview information, and then the MGU torque is determined from the computed engine torque and the actual torque request.

Figure 5:
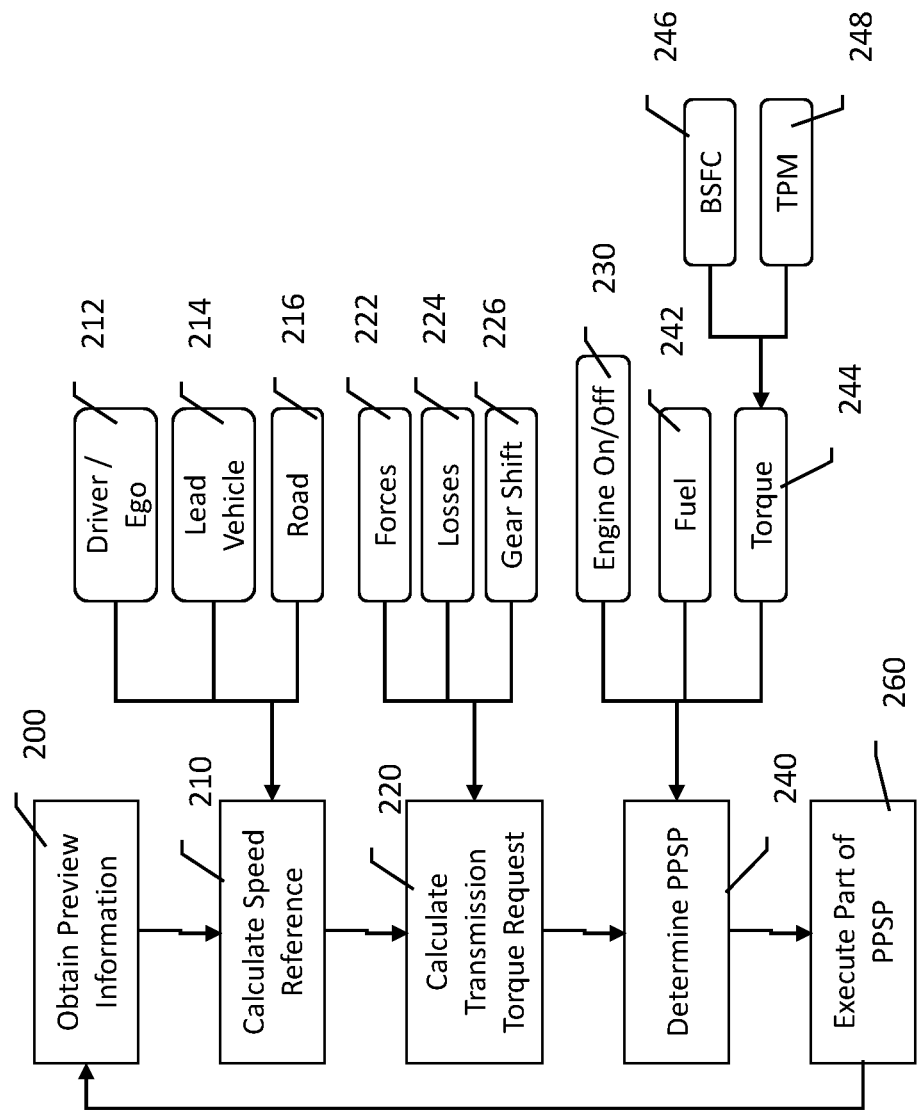
FIG. 5 is a block diagram for an overall control method.

FIG. 5 is a block diagram of another illustrative control architecture. At block 200, preview information is obtained. The preview information may include road data relating to a segment of upcoming roadway, including for example and without limitation, road grade, road curvature, posted speed limits, traffic information, lead vehicle information, prevailing speed or other traffic factors, weather, and/or other information. A speed reference is then calculated as shown at 210, where the speed reference represents the modeled speed of the vehicle in the upcoming roadway segment. The speed reference may be adjusted or may account for the driver and/or ego vehicle behavior 212, by the presence and potential modelled behavior of the lead vehicle 214, and by factors of the road 216, and/or other factors.

Using the speed reference, the system next calculates a transmission torque request at 220. The transmission torque request represents the total torque needed from the available power sources to allow the vehicle to travel in accordance with the speed reference, and accounts for the acceleration/forces 222 that the vehicle deals with in so doing, such as the impact of road grade and curvature, velocity changes due to changes in the speed reference from point to point, etc. In addition, losses 224 that will be incurred, including limits on the efficiency of the transmission, transaxle, differential, wheels, wind resistance, etc., can be included in the calculation. Additionally, the influence of gear shifting 226 is included as well, using for example, techniques described above in relation to the gear request.

A predictive power split plan (PPSP) is then generated at 240. The PPSP may take into account engine on/off factors at 230, as these can affect the overall efficiency or fuel usage. The PPSP may be realized using a real-time optimization, such as NMPC, or any other suitable analysis. The cost function may be constructed to minimize certain requirements on the powertrain, such as fuel economy, including the approaches using a fuel reference 242 or torque reference 244. The torque reference 244 approach may make further use of an engine torque reference developed from the transmission torque reference using the above discussed BSFC 246 and/or TPM 248 approaches.

Finally, one or more operational points of the PPSP are executed, as indicated at 260. Driver input is used in executing the operational point(s) of the PPSP by providing the input that generates the actual transmission torque request for the current time sample. The system uses the PPSP to determine an engine torque request, and relies on the MGU to make up the difference between the actual transmission torque request and that which is provided by the engine for at least the current time sample. The method may then iterate back to block 200, where new preview information is obtained and the process starts again.

In some examples, further subloops may be used. Rather than a complete iteration back to block 200, an example may perform several smaller iterations in which the speed reference and transmission torque reference, calculated for a preview window, are retained, and the PPSP is regenerated at block 240. A subloop of this type may be useful to allow the PPSP to adjust to the actual operations, such as with receipt of driver control inputs (accelerator or brake pedal actions, steering, etc.) or changes in vehicle operating conditions (such as the alternator drawing torque), which will change the SOC of the battery and/or the engine speed at each sample, allowing a recalculation of the BSFC and/or TPM to be performed. Iterating back to block 200 prevents the control solutions from drifting away from the optimized calculations over time.

Figure 6:
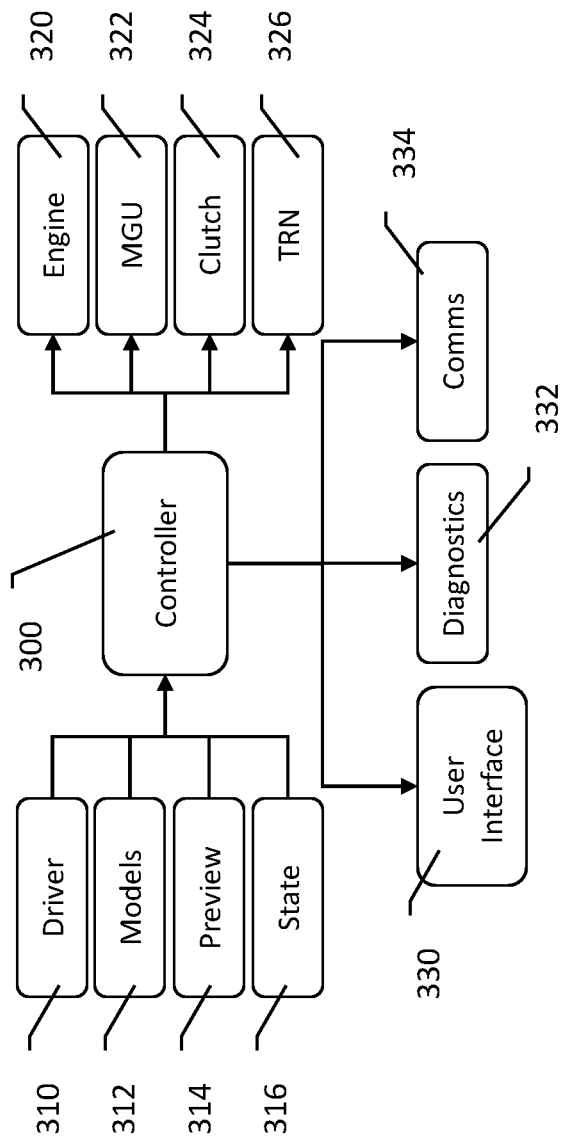
FIG. 6 shows an illustrative hybrid vehicle control architecture.
Figure 7:
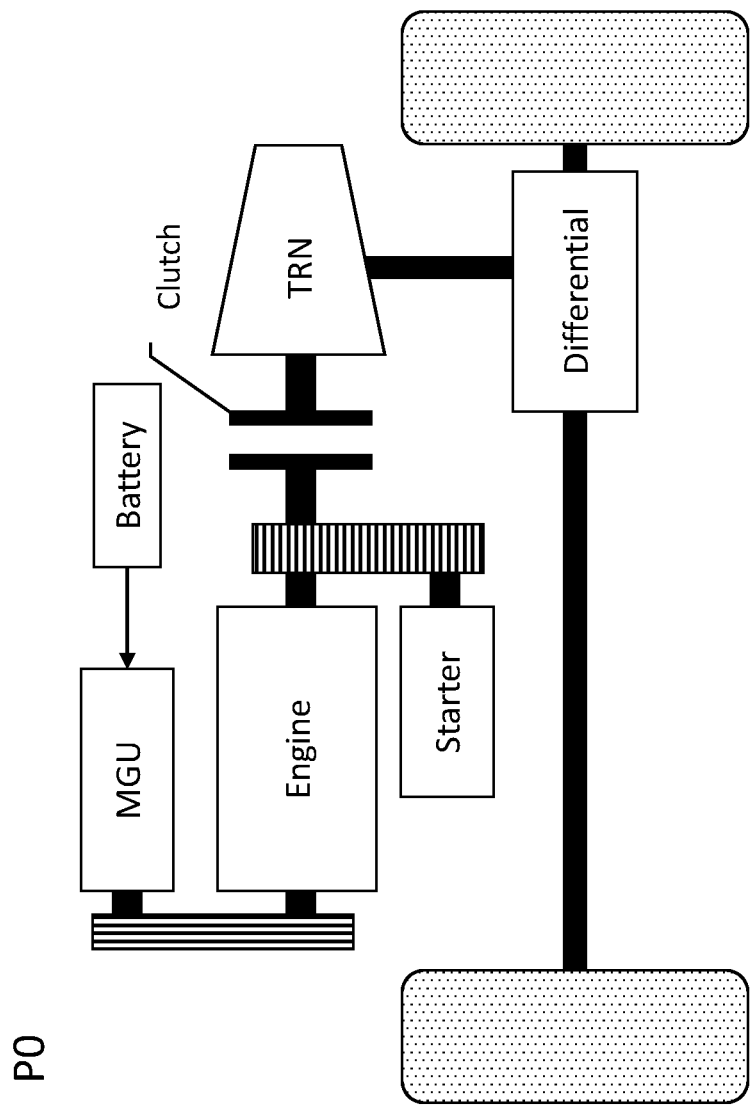
FIGS. 7-11 show several illustrative hybrid vehicle powertrain architectures.
Figure 8:
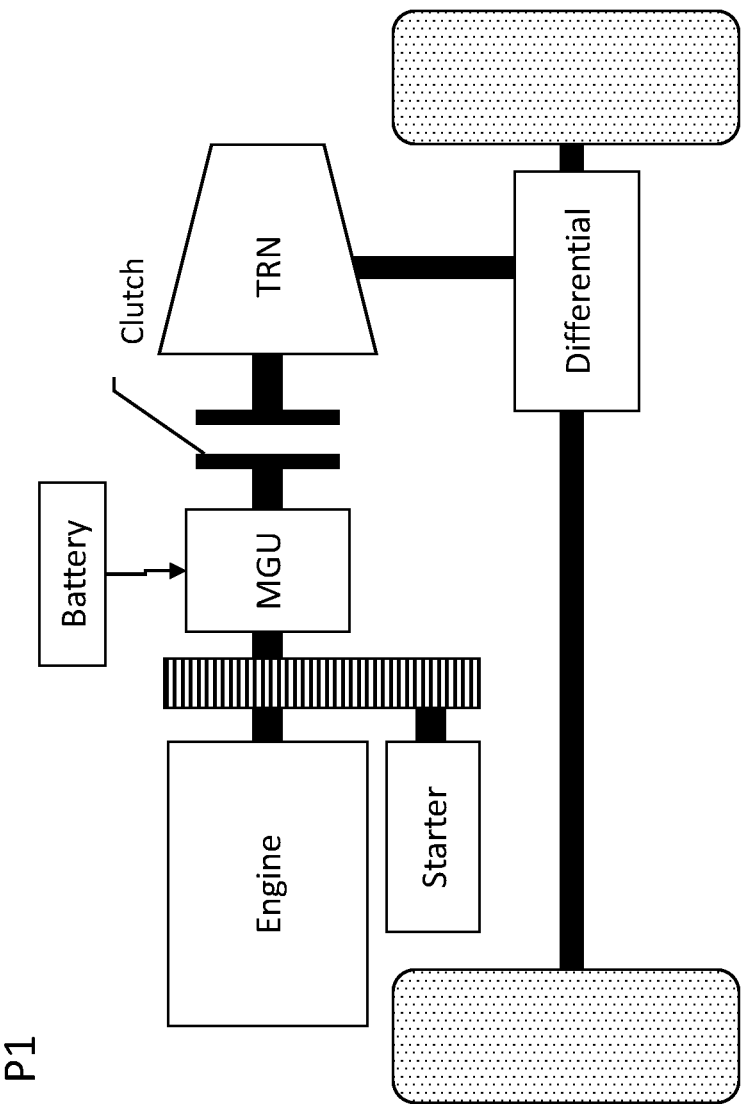

FIG. 6 shows an overall control architecture. The overall control structure includes a vehicle controller 300 that receives data/inputs from each of a driver 310, various system models or other stored information 312, preview information 314 such as from navigation, communication, and vehicle sensors, and current state data 316 relating to the current status of the system (such as engine and battery sensors sensors), and generates control outputs for the engine 320, the MGU 322, a clutch 324, and transmission 326. The controller 300 may also output data to a user interface 330, allowing the driver to receive information about ongoing operations, to a diagnostics module 332 where operating data, anomalies, faults, etc. can be stored, and/or to a communication module 334 for transmission off vehicle, such as to a fleet manager.

FIGS. 7-11 show several illustrative hybrid vehicle configurations. A P0 hybrid in FIG. 7 includes a battery that powers the MGU, which is coupled by a belt to the transmission drive shaft, which is also coupled to the engine. The engine and MGU cannot be decoupled here. A starter for the engine is also belt coupled to the transmission drive shaft. A clutch separates the transmission from the drive shaft. The transmission outputs torque to the differential, which couples to the drive wheels as shown. A P1 hybrid in FIG. 8 moves the MGU on the other side of the engine, and places it directly on the drive shaft. A starter for the engine is belt coupled to the transmission drive shaft. The engine and MGU cannot be decoupled here. A clutch separates the transmission from the drive shaft. The transmission outputs torque to the differential, which couples to the drive wheels as shown. The above described power split controller and associated analysis can be applied to a P0 or P1 hybrid architecture with minor changes. One adjustment is that the engine cannot be turned off while the vehicle is moving, because the MGU and ICE are coupled together. As a result, engine on/off can only be used when the vehicle is stopped.

Figure 9:
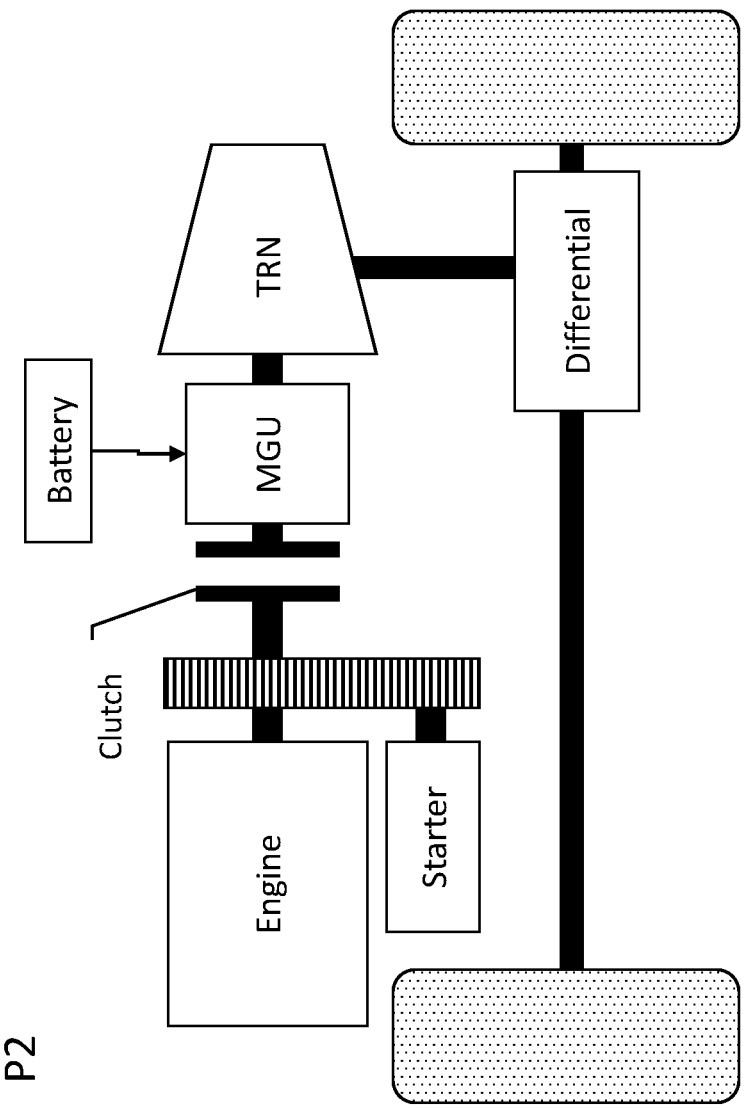

A P2 hybrid in FIG. 9 moves the MGU on the other side of the clutch. Here the engine and starter are coupled on one side of the clutch, and can be decoupled from the MGU and transmission. This makes the engine-off decision more useful. The MGU is not allowed to decouple, however. The transmission outputs torque to the differential, which couples to the drive wheels as shown.

Figure 10:
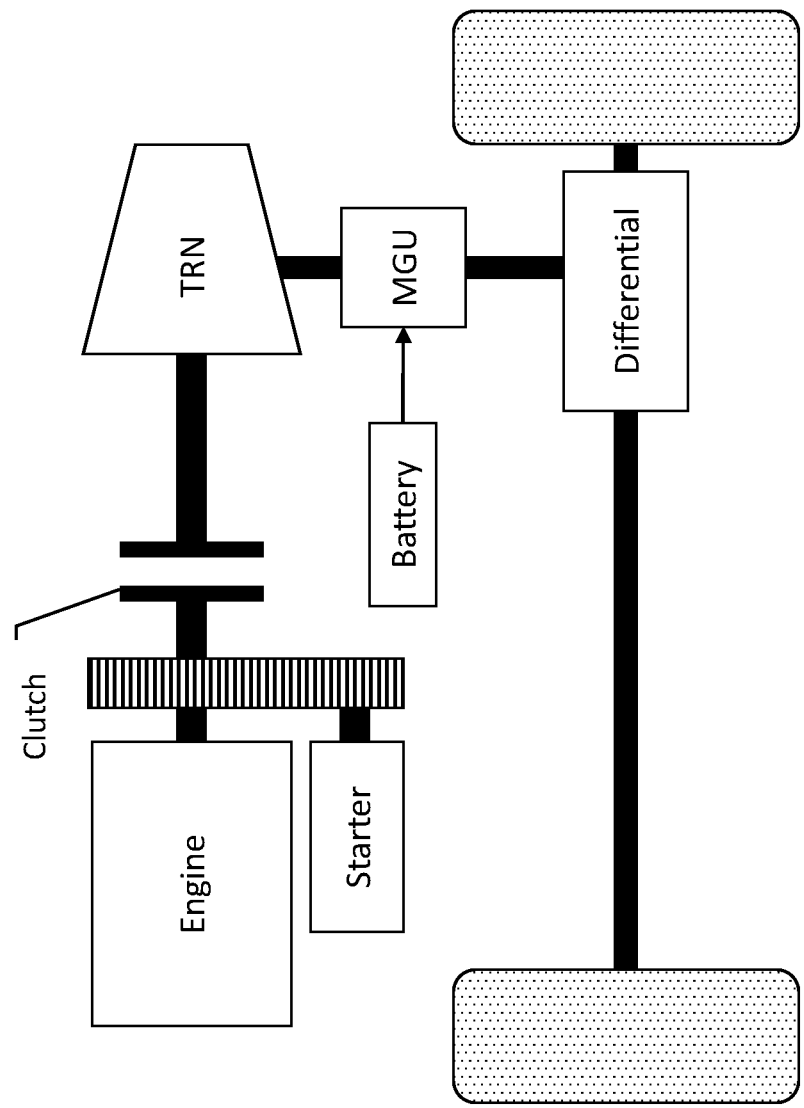
Figure 11:
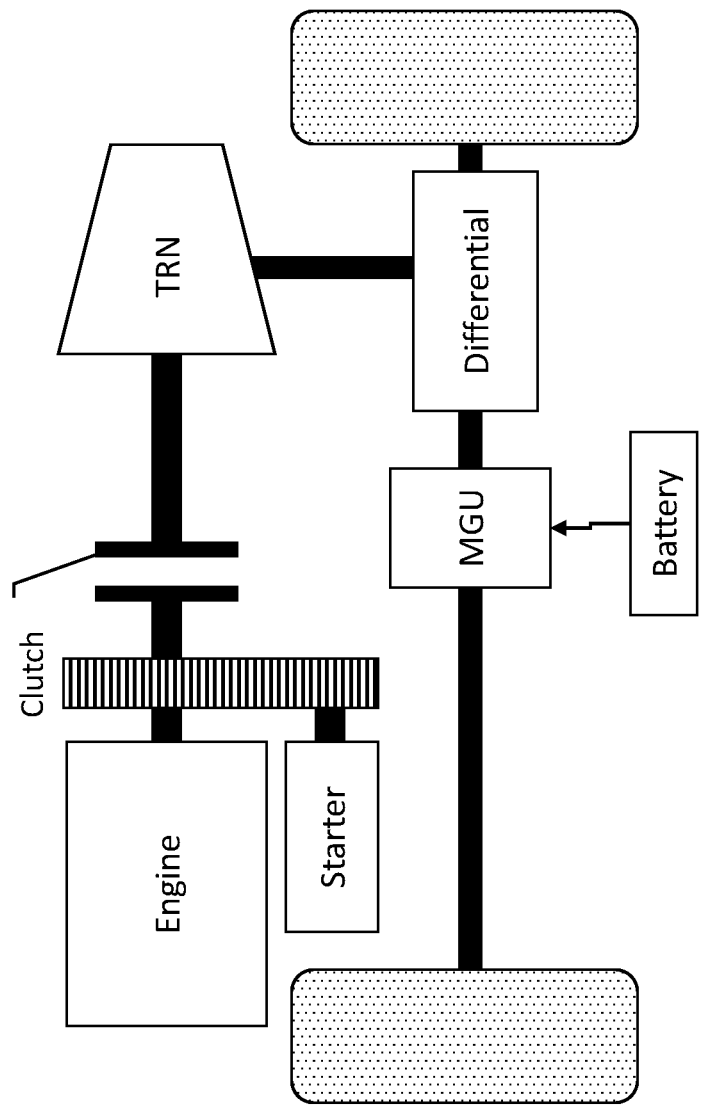

A P3 hybrid in FIG. 10 now places the engine, starter and clutch as with P2, but moves the MGU to a location between the transmission and the differential. A P4 hybrid in FIG. 11 places the MGU on the other side of the differential. An alternative to the P4 hybrid may include plural MGUs on each of the drive wheels. The above described power split controller is readily applied in each of the P3 and P4 hybrid configurations.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments or "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of operating a hybrid engine comprising a first power source that is a battery and a second power source that is an engine using a fuel, the hybrid engine being operated according to a power split to determine power generated by the first power source and the second power source, in an ego vehicle, the method comprising:
    obtaining preview information over a first preview window including data relating to an upcoming segment of road to be traveled by the ego vehicle;
    calculating an ego vehicle speed reference, wherein calculating the ego vehicle speed reference further includes determining that a lead vehicle is present in the upcoming segment of road, and adjusting the ego vehicle speed reference if a minimum distance to the lead vehicle is predicted to occur;
    calculating a transmission torque request based on the ego vehicle speed reference, using the data related to the upcoming segment of road;
    determining a first predictive power split plan between the first power source and the second power source from the transmission torque request, wherein determining the first predictive power split plan comprises calculating an engine torque request by minimizing a cost function within a prediction window, the cost function comprising weighted factors for each of terminal state of charge of the battery, a calculated engine torque reference, and engine torque request changes, and wherein the calculated engine torque reference is calculated using total power minimization in a control window in which an engine speed derived from the speed reference is used to find an engine torque split between energy from the fuel and equivalent battery energy at a given engine speed; and
    executing at least a first operation point in the first predictive power split plan to operate the hybrid engine in accordance with the first predictive power split plan and drive a driveshaft of the ego vehicle that is coupled the hybrid engine in accordance with the first predictive power split plan;
    wherein the data relating to the upcoming segment of road includes one or more of curvature, slope, traffic, traffic laws, and/or traffic signals.

2. The method of claim 1 wherein the first predictive power split plan comprises a plurality of operating points in the first preview window, further comprising after executing at least the first operation point, determining a second predictive power split plan and abandoning unexecuted operating points in the first predictive power split plan.

3. The method of claim 1, wherein calculating the transmission torque request is performed by determining torque needed to meet the ego vehicle speed reference after accounting for one or more characteristics of the upcoming segment of road selected from the group consisting of road grade, road curvature, prevailing traffic speed, and road speed limit.

4. The method of claim 1, wherein the method further includes determining an engine on or engine off state, and turning the engine on or off responsive to the determined engine on or engine off state.

5. The method of claim 1, wherein:
the step of determining the first predictive power split plan comprises calculating an engine torque request by minimizing a cost function within a prediction window, the cost function comprising weighted factors for each of terminal state of charge of the battery, fuel flow, and engine torque request changes.

6. The method of claim 1, wherein the calculated engine torque reference is calculated as a function of engine speed from an engine map.

7. The method of claim 1 wherein the step of executing at least the first operation point in the first predictive power split plan comprises receiving a driver input to determine the transmission torque request, using the predictive power split plan to determine torque from the second power source, and using the first power source to account for any difference between the transmission torque request and the torque from the second power source.

8. An ego vehicle comprising a hybrid engine with a first power source that is a battery and a second power source that is an engine using a fuel, the hybrid engine being operated according to a power split to determine power generated by the first power source and the second power source, and a controller configured to determine and execute the power split by:
obtaining preview information over a first preview window including data relating to an upcoming segment of road to be traveled by the ego vehicle;
calculating an ego vehicle speed reference, wherein calculating the ego vehicle speed reference further includes determining that a lead vehicle is present in the upcoming segment of road, and adjusting the ego vehicle speed reference if a violation of a minimum distance to the lead vehicle is predicted to occur;
calculating a transmission torque request based on the ego vehicle speed reference, using the data related to the upcoming segment of road;
determining a first predictive power split plan between the first power source and the second power source from the transmission torque request, wherein determining the first predictive power split plan comprises calculating an engine torque request by minimizing a cost function within a prediction window, the cost function comprising weighted factors for each of terminal state of charge of the battery, a calculated engine torque reference, and engine torque request changes, and wherein the calculated engine torque reference is calculated using total power minimization in a control window in which an engine speed derived from the speed reference is used to find an engine torque split between energy from the fuel and equivalent battery energy at a given engine speed; and
executing at least a first operation point in the first predictive power split plan to operate the hybrid engine in accordance with the first predictive power split plan and drive a driveshaft of the ego vehicle that is coupled the hybrid engine in accordance with the first predictive power split plan;
wherein the data relating to the upcoming segment of road includes one or more of curvature, slope, traffic, traffic laws, and/or traffic signals.

9. The ego vehicle of claim 8, wherein the controller is configured:
such that wherein the first predictive power split plan comprises a plurality of operating points in the first preview window; and
after executing at least the first operation point, to determine a second predictive power split plan and abandon unexecuted operating points in the first predictive power split plan.

10. The ego vehicle of claim 8, wherein the controller is configured to calculate the transmission torque request by determining torque needed to meet the ego vehicle speed reference after accounting for one or more characteristics of the upcoming segment of road selected from the group consisting of road grade, road curvature, prevailing traffic speed, and road speed limit.

11. The ego vehicle of claim 8, wherein the controller is further configured to determine an engine on or engine off state, and to turn the engine on or off responsive to the determined engine on or engine off state.

12. The ego vehicle of claim 8, wherein the controller is configured to determine the first predictive power split plan by calculating an engine torque request by minimizing a cost function within a prediction window, the cost function comprising weighted factors for each of terminal state of charge of the battery, fuel flow, and engine torque request changes.

13. The ego vehicle of claim 8, wherein the controller is configured to calculate the engine torque reference as a function of engine speed from an engine map.

14. The ego vehicle of claim 8, wherein the controller is configured to execute at least the first operation point in the first predictive power split plan by receiving a driver input to determine the transmission torque request, determining torque from the second power source by reference to the predictive power split plan, and determining torque from the first power source to account as a difference between the transmission torque request and the torque from the second power source.

15. A method of operating a hybrid engine comprising a first power source having a battery and a second power source is an engine using a fuel, the hybrid engine being operated according to a power split to determine power generated by the first power source and the second power source, in an ego vehicle, the method comprising:
obtaining data relating to an upcoming segment of road to be traveled by the ego vehicle;
calculating an ego vehicle speed reference;
calculating a transmission torque request based on the ego vehicle speed reference, using the data related to the upcoming segment of road;
determining a first predictive power split plan between the first power source and the second power source from the transmission torque request, wherein determining the first predictive power split plan comprises calculating an engine torque request by minimizing a cost function within a prediction window, the cost function comprising weighted factors for each of terminal state of charge of the battery, a calculated engine torque reference, and engine torque request changes, wherein the calculated engine torque reference is calculated using total power minimization in a control window in which an engine speed derived from the speed reference is used to find an engine torque split between the energy from the fuel and equivalent battery energy at a given engine speed; and
executing at least a first operation point in the first predictive power split plan to operate the hybrid engine in accordance with the first predictive power split plan and drive a driveshaft of the ego vehicle that is coupled the hybrid engine in accordance with the first predictive power split plan;

wherein the data relating to the upcoming segment of road includes one or more of curvature, slope, traffic, traffic laws, and/or traffic signals.

\* \* \* \* \*